United States Patent [19]

Edelstein et al.

[11] Patent Number: 4,748,661
[45] Date of Patent: May 31, 1988

[54] CIRCUIT FOR TRANSLATING TELEPHONE NUMBERS

[75] Inventors: Marvin G. Edelstein, San Rafael; Robert A. Wilson, III, Fremont, both of Calif.

[73] Assignee: Pacific Bell, San Francisco, Calif.

[21] Appl. No.: 828,633

[22] Filed: Feb. 11, 1986

[51] Int. Cl.$^4$ .............................................. H04Q 3/47
[52] U.S. Cl. ................................. 379/289; 379/216
[58] Field of Search .............................. 379/196–199, 379/188, 216, 258, 268, 284, 289, 355

[56] References Cited

U.S. PATENT DOCUMENTS

| | | | |
|---|---|---|---|
| 3,573,389 | 4/1971 | Greenstein et al. | 379/216 X |
| 3,860,762 | 1/1975 | Klaiber et al. | 379/189 |
| 3,873,781 | 3/1975 | Nissim | 379/200 |
| 4,171,469 | 10/1979 | Brooks | 379/216 |
| 4,177,358 | 12/1979 | Mason | 379/197 |
| 4,215,246 | 7/1980 | Sawyer | 379/105 |
| 4,234,764 | 11/1980 | Beebe | 379/200 |
| 4,314,108 | 2/1982 | Sharvit | 379/188 |
| 4,332,985 | 6/1982 | Samuel | 379/355 X |
| 4,460,806 | 7/1984 | Canniff et al. | 379/386 |
| 4,578,540 | 3/1986 | Borg et al. | 379/355 X |
| 4,608,460 | 8/1986 | Carter et al. | 379/201 X |

Primary Examiner—James L. Dwyer
Attorney, Agent, or Firm—Fitch, Even, Tabin & Flannery

[57] ABSTRACT

A circuit for translating predetermined telephone numbers to new digit sequences, referred to as the translated number, is disclosed. Each of the original telephone numbers consists of a first sequence of digits, referred to as the switch sequence, followed by a second sequence of digits, referred to as the recognition sequence. Additional digits may be present after the recognition sequence. The corresponding translated telephone number consists of the switch sequence of the original telephone number followed by a second sequence of digits, referred to as the end sequence. Telephone numbers which do not being with one of the specified switch sequences are allowed to pass through the present invention unchanged without the introduction of a delay.

6 Claims, 2 Drawing Sheets

CIRCUIT FOR TRANSLATING TELEPHONE NUMBERS

BACKGROUND OF THE INVENTION

The present invention relates to the field of telephone switching equipment and, more particularly, to circuits for converting one telephone number to another telephone number.

Specific telephone services are typically requested by dialing a predetermined number. For example, "0" is used to reach the operator, 411 is typically used to reach an information operator. The central office digit receiver is programmed to recognize specific numbers and route then to the correct circuits.

Changes in the numbers used to request certain common services such as operator assistance are being forced by the need to accommodate several different telephone service companies. In addition new services which are extensions of previously offered services are being added. These changes either require the telephone subscriber to learn a new set of numbers for these common services, or they require that the central office switching circuitry be reprogrammed.

Where possible, the numbers which connect the subscriber to the new service in question should be extensions of the numbers used to connect the subscriber to the previous similar service. This minimizes the effort needed to remember the new numbers. For example, before the deregulation of the telephone industry, only one number was needed for operator assistance, i.e., "0". Since deregulation, each subscriber has a separate long distance service. Hence, the subscriber needs two different numbers for operator assistance, one for local operator assistance and one for long distance operator assistance. The most desirable choice for this second number, i.e., long distance operator assistance, would be "00". However, most existing switching circuitry recognizes "00" as requesting immediate connection to a local operator ("0" connects the subscriber to the local operator after a delay which is sufficient to determine if the "0" is followed by a telephone number). Hence to use "00" for long distance operator assistance, it would be necessary to reprogram the existing switching circuitry, which is a costly process.

It is important that any circuit for translating a subscriber dialed telephone number into a new number which is compatible with the existing central office switches not introduce delays into calls which do not require translation. For example, a simple translation circuit could be placed in series with the digit receiver of the central office between the subscriber and the digit receiver. In the simplest embodiment, such a circuit would receive the number dialed by the subscriber, check it against an internal list of numbers to be translated, and then outpulse the number or its appropriate translation to the digit receiver. However, it would have to repeat each number which is not to be translated. This would introduce a delay equal to the time needed to outpulse the entire telephone number into every telephone number dialed whether or not it required translation. This is unsatisfactory.

This delay can be significantly reduced by providing a means for recognizing numbers not requiring translation before the entire number is received. For example, the prefix of the number is sufficient in most cases to determine that it is not one of the numbers which needs to be translated. Such a system could then begin to outpulse the telephone number before it received the entire number from the subscriber. However, such a system would still need to receive at least the first digit of the number being dialed. Hence, even this system would introduce a delay equal to the time needed to repeat one digit into the system. Such delays increase the time needed to connect a call and hence increase the load on the switching system and digit receiver.

In addition to increasing the loads on the switching system, long delays in the translation of telephone numbers discriminate against suppliers of the new telephone services. Equal access to the telephone system for all suppliers of subscriber services requires that long delays not be introduced by the telephone switching system when supplying services by a company which is different from the one providing the local switching system. A long delay would make the outside service less attractive to the subscriber than a similar service provided by the company controlling the local switching system. Hence, a dialed number can not be satisfactorily translated into another number merely by placing a translating circuit in between the subscriber and the central office as described above.

It is a general object of the present invention to provide an improved circuit for converting one telephone number into another telephone number.

It is another object of the present invention to provide a means for converting a specified sequence of digits dialed by subscriber to a second predetermined series of digits without the need to reprogram the central office switching circuitry and without significantly increasing the average time required to connect a subscriber to a requested service.

It is a further object of the present invention to provide long distance operator service upon receiving the digit sequence "00".

These and other objects of the present invention will become apparent from the following detailed description of the invention and the accompanying drawings.

SUMMARY OF THE INVENTION

The present invention consists of a circuit for translating predetermined telephone numbers to new digit sequences, referred to as the translated number. Each of the original telephone numbers consists of a first sequence of digits, referred to as the switch sequence, followed by a second sequence of digits, referred to as the recognition sequence. Additional digits may be present after the recognition sequence. The corresponding translated telephone number consists of the switch sequence of the original telephone number followed by a second sequence of digits, referred to as the end sequence.

The circuit scans the digits of an incoming telephone call for one or more specified switch sequences. The circuit includes a routing switch which is placed in series with the central office digit receiver between the digit receiver and the subscriber's telephone. This routing switch is controlled by a comparison circuit which detects a dialed telephone number which begins with a digit sequence which matches a switch sequence of one of the telephone numbers to be translated.

Telephone numbers which do not begin with one of the specified switch sequences are allowed to pass through the present invention unchanged without the introduction of a delay. When a telephone number is detected which begins with a sequence of digits which matches the switch sequence of one of the telephone numbers to be translated, the line between the subscriber and the central office digit receiver is interrupted. All subsequent digits of the dialed telephone number are then absorbed by the present invention. If the digit sequence absorbed after the switch sequence is recognized matches the recognition sequence for the telephone number in question, the end sequence corresponding to said telephone number is outpulsed to the central office digit receiver. If digit sequence absorbed after the switch sequence is recognized does not match the recognition sequence for any telephone number having the switch sequence in question, the digits absorbed by the present invention after the switch sequence was detected are merely repeated to the central office digit receiver. This repetition may commence as soon as the sequence of digits received after the switch sequence fails to match the corresponding digits of any telephone number to be translated having said switch sequence.

DETAILED DESCRIPTION OF THE INVENTION

Figure 1:
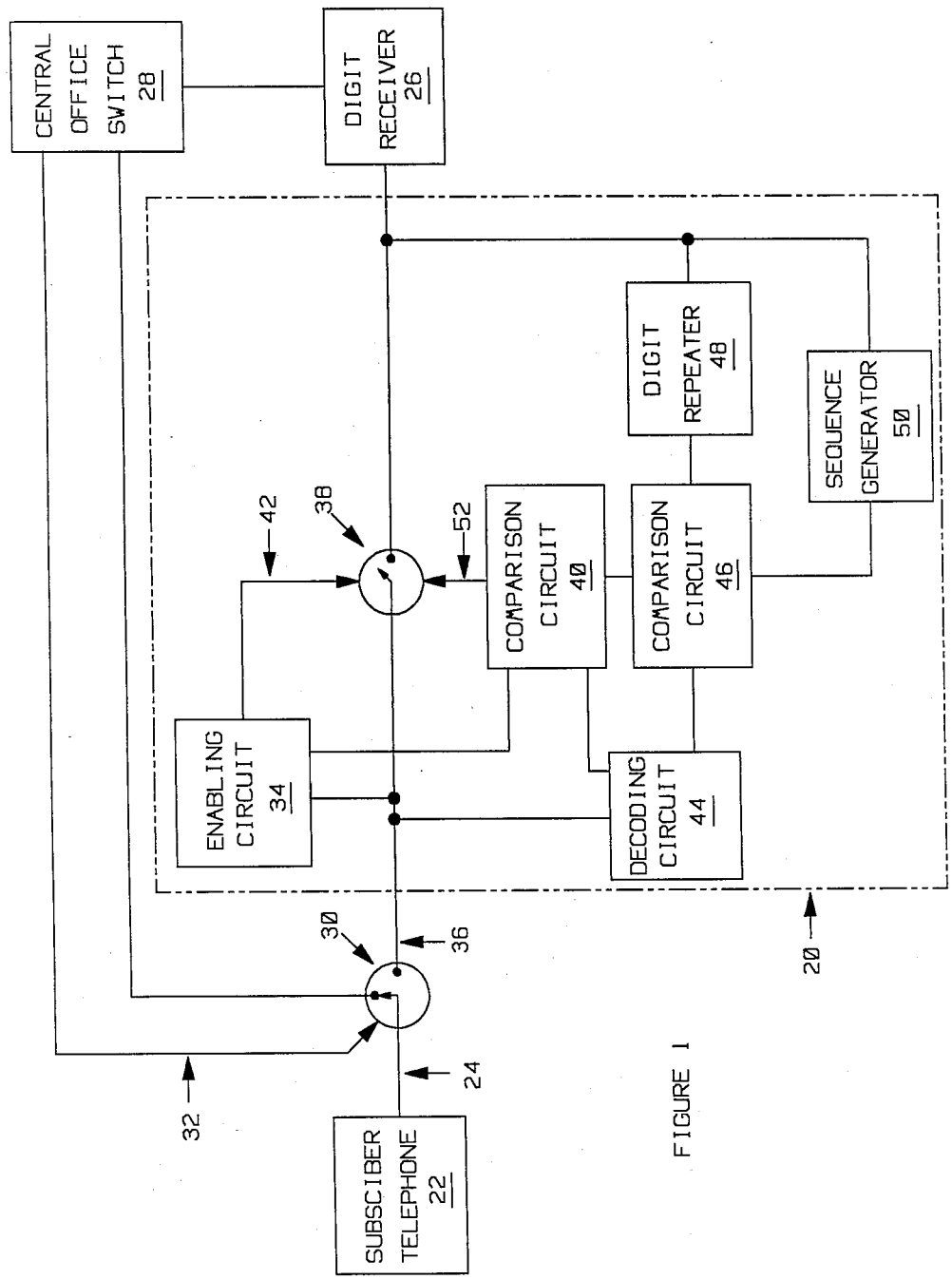
FIG. 1 is a block diagram illustrating two circuits according to the present invention for translating a single telephone number into a second telephone number.

The present invention may be most easily understood with reference to a circuit for translating the telephone number "00" to a telephone number beginning with "0", for example, "010". A block diagram of a circuit according to the present invention for performing this translation is shown at 20 in FIG. 1. In a conventional telephone circuit, a subscriber 22 places a telephone call on a line 24 which is either connected to a digit receiver 26 or a central office switch 28 depending on the state of a switch 30 which is under the control of the central office switch 28. The central office switch 28 controls switch 30 by signals on control line 32. When the subscriber lifts the receiver of the telephone, the central office switch 28 connects line 24 to the digit receiver 26 which interprets the telephone number dialed by the subscriber. The dialed number is sent one digit at a time over the line 24 either in pulse encoded format or tone encoded format. When the digit receiver 26 has received the entire number, it transmits the number to the central office switch 28 which then changes the state of switch 30 such that the line 24 is connected to the central office switch 28.

The circuit of the present invention 20 is connected in series with the digit receiver 26 between switch 30 and the digit receiver 26. It consists of seven elements which carry out the functions needed to examine the digits of an incoming telephone number and translate those calls to "00" to calls to "010". First, an enabling circuit 34 detects the connection of the subscriber's line 24 to the digit receiver 26. This is accomplished by detecting the appropriate potentials on line 36. Such circuits are conventional in the art of telephone switching circuitry.

When the enabling circuit 34 detects the connection of a subscriber's line to the digit receiver 26, it sets the state of the second and third elements, a routing switch 38 and a first comparison circuit 40. The routing switch 38 has two states, a first state in which the subscriber's line is connected to the digit receiver 26 and a second state in which the line between switch 30 and the digit receiver 26 is interrupted. When the enabling circuit 34 detects the connection of the subscriber's line to line 36, it sets the routing switch 38 to the first state by appropriate signal on control line 42. Such routing switches are conventional in the electrical circuit arts.

The first comparison circuit 40 examines the digits of the incoming telephone call with the aid of the fourth element, a digit decoding circuit 44. The digit decoding circuit 44 translates the dialed telephone number which may be either in pulse encoded format or tone encoded format into a digital form which may be used by the first comparison circuit 40 which in the preferred embodiment is a microprocessor. The first comparison circuit 40 examines the first digit of the telephone number. If said digit is not a "0", the first comparison circuit 40 takes no further action until a new telephone number is detected on line 36 by the enabling circuit 34.

If the first digit of the incoming telephone number is a "0", the first comparison circuit 40 sets the routing switch 38 to its second state thus interrupting the line between the subscriber 22 and the digit receiver 26. It should be noted that the digit receiver 26 will have received the first digit of the dialed telephone number before the first comparison circuit 40 disconnects it from the line 36. The first comparison circuit 40 then enables the fifth element, a second comparison circuit 46 which in the preferred embodiment is also a microprocessor. It will be apparent to those skilled in the electronic circuit arts that the functions carried out by the first and second comparison circuits 40 and 46 may be combined into the same microprocessor.

The second comparison circuit 46 examines the second digit of the incoming telephone number. If it is not a "0", the second comparison circuit 46 causes this digit and all subsequent digits of the dialed telephone number to be repeated to the digit receiver 26 by sending appropriate signals to the sixth element of the present invention, a digit repeating circuit 48, which translates each digit into the encoded format in which the first digit was received, i.e., pulse or tone encoded.

If the second digit of the dialed telephone number was a "0", the second comparison circuit 46 causes the seventh element of the present invention, an end sequence generating circuit 50, to send the sequence "10" to the digit receiver 26 in the appropriate encoded format. As noted above, the first digit of the dialed telephone number, namely "0", will have already reached the digit receiver 26. Hence, the digit receiver 26 will receive the telephone number "010" in place of "00". After the second comparison circuit 46 signals the end sequence generating circuit 50, it takes no further action until a new telephone number is detected by the enabling circuit 34.

It should be noted that telephone numbers which do not begin with "0" suffer no delay in reaching the digit receiver 26, since these numbers are routed directly to the digit receiver 26 by the circuit of the present invention. Those telephone numbers which begin with "0" suffer a delay equal to the time needed to repeat one digit.

The circuit shown in FIG. 1 may be used to translate any telephone number to another telephone number provided the telephone numbers begin with the same sequence of digits. This common sequence of digits will be referred to as the switch sequence. The telephone number to be translated consists of the switch sequence followed by a second sequence of digits, referred to as the recognition sequence. The telephone number to be translated may be followed by additional digits which are ignored. Hence if the switch sequence was 22 and the recognition sequence 455, any telephone number which began with 22455 would be translated to the new telephone number which consists of the switch sequence followed by a third sequence of digits, referred to as the end sequence.

The translation process begins as in the "00" example described above. The enabling circuit 34 detects the beginning of a telephone number and initializes the routing switch 38 and the first comparison circuit 40. If the switch sequence contains K digits, the first comparison circuit 40 examines the first K digits of the incoming telephone call. If these digits do not match the switch sequence, no further action is taken until a new telephone number is detected by the enabling circuit 34. If the first K digits match the switch sequence, the first comparison circuit 40 causes line 36 to be interrupted by signals to routing switch 38 on control line 52. It then enables the second comparison circuit 46 which absorbs the remaining digits of the incoming telephone number.

As each digit of the telephone number is received by the second comparison circuit 46, the digits received by the second comparison circuit 46 since the routing switch 38 caused line 36 to be interrupted are compared with the corresponding digits of the recognition sequence in question. If these do not match these digits, all of the digits absorbed by the second comparison circuit 46 are outpulsed to the digit receiver 26 together with any subsequent digits of the telephone number in question. This procedure minimizes the delay incurred when a telephone number which is not to be translated, but which begins with correct switch sequence, must be repeated to the digit receiver 26.

If the recognition sequence contains P digits and these digits match the first P digits received by the second comparison circuit 46 after routing switch 38 caused line 36 to be interrupted, the second comparison circuit 46 causes the end sequence to be sent to the digit receiver 26 by sending the appropriate signals to the end sequence generating circuit 50. Any additional digits on line 36 following the recognition sequence are ignored. Hence all telephone numbers beginning with switch sequence followed by the recognition sequence are translated into the single telephone number consisting of the switch sequence followed by the end sequence.

As in the "00" example, telephone numbers which do not begin with the switch sequence do not suffer a delay. Those telephone numbers which are not to be translated but which begin with the switch sequence suffer a delay equal to the time needed to detect that the digits received after the switch sequence do not match the corresponding digits of the recognition sequence.

Figure 2:
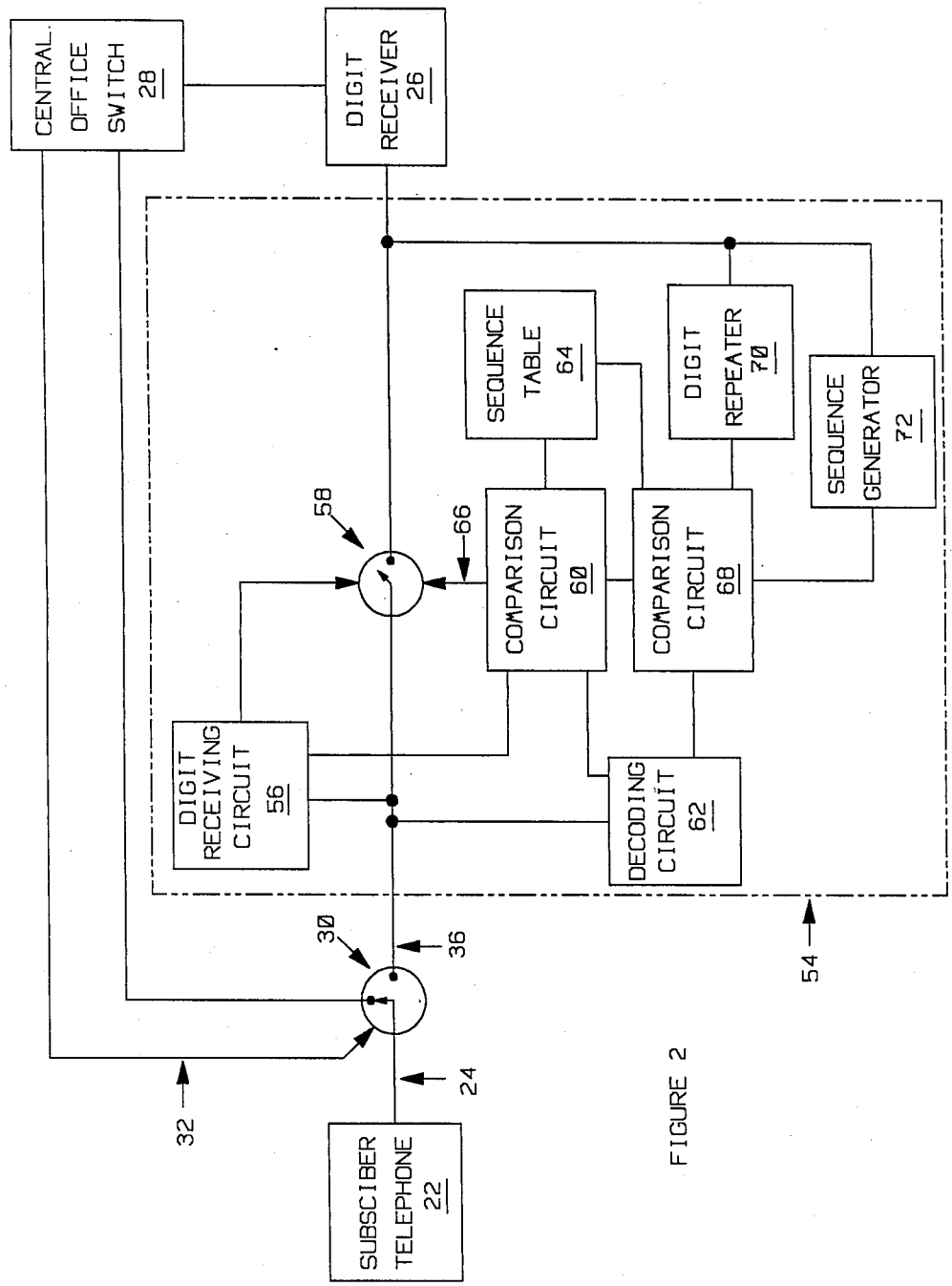
FIG. 2 is a block diagram illustrating two circuits according to the present invention for translating any of a plurality of telephone numbers into a corresponding telephone number.

A still more general embodiment of the circuit of the present invention is shown at 54 in FIG. 2. This circuit is intended for applications in which a plurality of telephone numbers are to translated into corresponding telephone numbers. Each telephone number to be translated consists of a switch sequence and a recognition sequence as described above. The corresponding telephone number into which said telephone number is to be translated consists of the same switch sequence followed by an end sequence. The end sequence may be omitted, in which case the translated telephone number consists of the switch sequence. Similarly, the recognition sequence may be omitted which results in all telephone numbers beginning with the switch sequence in question being translated into the switch sequence followed by the end sequence, if such an end sequence is stored with said switch sequence.

This circuit operates in a manner analogous to that described with reference to FIG. 1 above. An incoming telephone number is detected by the enabling circuit 56 which connects line 36 to the digit receiver 26 and initializes the first comparison circuit 60. The first comparison circuit 60 accumulates each successive digit of the incoming telephone number, preferably in a register contained in said comparison circuit. After each digit is so accumulated, the first comparison circuit 60 compares the number accumulated by it with the switch sequences having the same number of digits. These switch sequences are stored in a table 64. When the ith digit of the incoming telephone number is stored in said register, the first comparison circuit 60 compares the contents of said register with each switch sequence which has a length of i digits. If the contents of said register do not match any of the switch sequence having i digits stored in table 64 or if there are no switch sequences having i digits so stored, the first comparison circuit 60 waits for the next digit of the incoming telephone number and repeats the comparison.

If the contents of said register match one of the switch sequences stored in table 64, the first comparison circuit 60 causes the digit receiver 26 to be disconnected from line 36 by setting the state of the routing switch 58 by signals on control line 66. It then initializes the second comparison circuit 68. The second comparison circuit 68 is responsible for comparing the remaining digits of the telephone number dialed on line 36 with the recognition sequence of each telephone number stored in table 64 having a switch sequence which matches the switch sequence which caused the state of the routing switch 58 to be changed.

In the preferred embodiment, the second comparison circuit 68 also has a register which is used to accumulate the digits of the incoming telephone number. When the second comparison circuit 68 is initialized by the first comparison circuit 60 the digits accumulated from the start of the incoming telephone number are also stored in this register. As each successive digit of the incoming telephone number is received by the second comparison circuit 68, it is accumulated in this register. The contents of this register are then compared with each of the telephone numbers to be translated which are stored in the table 64. The first such comparison is carried out at the time the second comparison circuit 68 is enabled. This allows telephone numbers having no recognition sequence to be properly translated. The remaining comparisons are carried out after each digit is received on line 36. When the jth digit of the incoming telephone number is received, it is placed in said register and then the contents of said register are compared with all telephone numbers to be translated which have a length of j digits. If a match is not found between a telephone number to be translated having j digits, and the contents of said register, or if there are no telephone numbers of length j digits to be translated, the second comparison circuit 68 does nothing unless j is greater than some predetermined value or a predetermined time interval has elapsed. In this case, the digits of the dialed telephone number which were received after the routing switch 58 changed state are repeated to the digit receiver. This is accomplished by signals specifying said digits being sent to the digit repeating circuit 70 by the second comparison circuit 68. The circuit of the present invention then enters a wait state until another telephone number is detected on line 36.

If the second comparison circuit 68 finds a telephone number to be translated having a length of j digits which matches the contents of said register, it causes the end sequence corresponding to said telephone number, if such an end sequence exists, to be sent to the digit receiver 26. This is accomplished by signals specifying said end sequence being sent to the end sequence generating circuit 72. The circuit of the present invention then enters a wait state until another telephone number is detected on line 36.

The operation of this embodiment of the present invention may be better appreciated with reference to a specific example. Consider a circuit which is programmed to translate the telephone number 235-7422 to the telephone number 235-2100, the telephone number 472 followed by any sequence of digits to the telephone number 472, and the telephone number 258-6000 to 259. The first translation involves translating one telephone number to another of the same length. The switch sequence for this translation is 235, the recognition sequence is 7422, and the end sequence is 2100. The second translation results in all telephone numbers beginning with 472 being truncated to 472. The switch sequence for this translation is 472. Both the recognition sequence and end sequence are absent here. The third translation results in a telephone number being translated to a different shorter telephone number. The switch sequence in this third case is 25. The recognition sequence is 86000, and the end sequence is 9.

We wish to consider the response of the present invention when programmed as indicated above to each of the following telephone numbers being dialed. If 478-8890 were dialed, the present invention would take no action, since the first digits of this telephone number do not match any of the switch sequences listed above. Hence this telephone number would reach the digit receiver 26 without any delay.

If 235-7500 were dialed, the present invention would cause the routing switch 58 to disconnect the digit receiver from line 36 after the sequence "235" was dialed, since this sequence matches the switch sequence of the first telephone number to be translated. The remaining digits "7500" would be absorbed by the present invention. As soon as the digit receiver 26 is disconnected from line 36, the second comparison circuit 68 will check for any telephone number having a switch sequence of 235 and no recognition sequence being present in the table 64. Since no such case exists in this example, the second comparison circuit 68 will continue absorbing digits. As each digit is absorbed, it will compare the telephone number consisting of the digits stored since the beginning of the telephone number with all telephone numbers of the same length in the table 64. This is equivalent to comparing all the stored recognition sequences corresponding to a telephone number with a switch sequence of 235 with the digits received by the second comparison circuit since the digit receiver was disconnected from line 36. Since these digits do not match the recognition sequence of any telephone number having a switch sequence of 235, they will merely be repeated to the digit receiver 26. The repetition in question will commence when it is clear that the digits in question do not match any of the recognition sequences stored in table 40. This will occur after the "5" is received by the second comparison circuit 68. The end of said telephone number is signaled by a predetermined number of digits being stored by the second comparison circuit 68 or the a predetermined time interval having elapsed since the detection of the first digit on line 36. This telephone number will be delayed by the time needed to repeat the four digits "7500" to the digit receiver.

If 235-7422 were dialed, the present invention would cause the routing switch 58 to disconnect the digit receiver 26 from line 36 after "235" was dialed. The remaining digits "7422" would be absorbed by the present invention. As each digit is absorbed the appropriate comparisons will be made by the second comparison circuit 68. When the last "2" is absorbed, the second comparison circuit 68 will find a match with the first telephone number stored in the table 64. It will then cause the end sequence stored for this table entry, namely "2100" to be outpulsed to the digit receiver 26.

If 472-2200 were dialed, the present invention would cause the routing switch 58 to disconnect the digit receiver 26 from line 36 after the sequence "472" was dialed. The second comparison circuit 68 would then search table 64 for any telephone number with a switch sequence of 472 and no recognition sequence. Since the second telephone number in table 64 has these properties, the second comparison circuit will cause the end sequence, if any, associated with this telephone number to be outpulsed to the digit receiver 26. In the example in question, no such end sequence exists, hence the present invention will merely enter the wait state described above. It should be noted that the sequence "2200" which followed the "472" will be absorbed by the present invention. In this case, there is no delay in the receipt of the telephone number by the digit receiver 26.

Finally, if 258-6000 were dialed, the present invention would cause the routing switch 58 to disconnect the digit receiver from line 36 after the sequence "25" was detected. The remaining digits will be absorbed by the present invention. The second comparison circuit will again make a comparison between the digits detected on line 36 and the stored telephone numbers to be translated after the line 36 is disconnected from the digit receiver 26 and after each successive digit of the telephone number is received. When the last "0" is received, the second comparison circuit 68 will detect a match with the third telephone number stored in the table 64. It will then cause the end sequence corresponding to this number, namely "9", to be outpulsed to the digit receiver 26.

Various modifications will be apparent to those skilled in the art without departing from the present invention as claimed.

What is claimed is:

1. An apparatus adapted for use in a telephone system including a telephone circuit for connecting a subscriber telephone to a central office switching system, said central office switching system including digit receiving means coupled to said telephone circuit for receiving the digits of a telephone number dialed on a subscriber telephone, said telephone comprising means for coupling signals indicative of said dialed telephone number onto said telephone circuit, said telephone system further including central office routing switch means for connecting and disconnecting said digit receiving means from said telephone circuit, an apparatus for converting each telephone number which is dialed by a said subscriber and which belongs to a predetermined set of telephone numbers into a corresponding telephone number which is received by said digit receiving means wherein each of said telephone numbers in said predetermined set consists of a sequential set of digits comprising a switch sequence followed by an optional recognition sequence consisting of one or more digits and said corresponding telephone number consists of a sequential set of digits comprising said switch sequence followed by an optional end sequence consisting of one or more digits, said apparatus comprising:

means for connecting said apparatus into said telephone system at a location between said central office routing switch means and said digit receiving means such that said apparatus intercepts said signals indicative of said dialed telephone numbers prior to said signals entering said digit receiving means when said central office routing switch means has connected said telephone circuit to said digit receiving means;

enabling means for detecting signals indicative of the start of a telephone number dialed on said telephone circuit;

digit detecting means for detecting and decoding the signals indicative of the digits of a telephone number dialed on said telephone circuit at a point in said apparatus prior to the point at which said apparatus is connected to said digit receiving means;

table means for storing information specifying the switch sequence and recognition sequence for each telephone number in said predetermined set and the end sequence of the telephone number corresponding to each said telephone number;

disconnecting switch means for disconnecting said digit receiving means from said telephone circuit, said disconnecting switch means having a first state in which said digit receiving means is connected to said telephone circuit and receives the said signals indicative of each digit dialed on said telephone circuit and a second state in which said digit receiving means is disconnected from said telephone circuit and does not receive said signals, said disconnecting switch means being connected to said enabling means and being set to said first state when said enabling means detects the start of a telephone number dialed on said telephone circuit;

first comparing means, coupled to said table means, for determining if the digits detected by said digit detecting means match the switch sequence of any of the telephone numbers stored in said table means, said determination being made after each digit of said telephone number is detected on said telephone circuit, and for setting said disconnecting switch means to said second state when the digits so detected match the switch sequence of one of the telephone numbers stored in said table means; and second comparing means, coupled to said table means and responsive to said disconnecting switch means being in said second state, for determining if the digits detected by said digit detecting means after said disconnecting switch means is set to said second state match the recognition sequence of a telephone number stored in said table means having a switch sequence which matched the digits detected by said digit detecting means before said disconnecting switch means is set to said second state, if such a match is found, for causing the end sequence stored for the telephone number whose switch sequence and recognition sequence match said digits, if such an end sequence exists, to be sent to said digit receiving means, and if such a match is not found for causing the digits detected after said disconnecting switch means is set to said second state to be sent to said digit receiving means, said match being defined to exist between a telephone number in said table means having no recognition sequence and having a switch sequence which matches the digits detected by said digit detecting means before said disconnecting switch means is set to said second state.

2. The apparatus of claim 1 wherein said predetermined set of telephone numbers comprises the telephone number "00".

3. The apparatus of claim 1 wherein said enabling means comprises means for determining that a subscriber's telephone has been connected to said telephone circuit.

4. The apparatus of claim 1 wherein said first comparing means comprises:

dialed number storage means for storing the digits of said telephone number dialed on said telephone circuit as said digits are detected by said digit detecting means; and means for comparing the digits in said dialed number storage means with each telephone number in said predetermined set having a switch sequence consisting of P digits when said dialed number storage means stores the Pth digit of a said telephone number dialed on said telephone circuit.

5. The apparatus of claim 4 wherein said second comparing means comprises:

recognition sequence storing means for storing the digits in said telephone number detected by said digit detecting means after said disconnecting switch means has been set to said second state;

means for comparing the digits in said recognition sequence storing means after each said digit is stored with the digits of the recognition sequence of each telephone number stored in said table means having a switch sequence which matches the digits detected by said digit detecting means before said disconnecting switch means was set to said second state and which consists of P digits when said recognition sequence storing means stores the Pth digit received after said disconnecting switch means has been set to said second state, and for generating a matched output signal if such a match was found;

end sequence generating means, responsive to said matched output signal, for sending the end sequence corresponding to the telephone number which causes said matched output signal to be generated to said digit receiving means; and digit repeating means for causing the digits stored in said recognition sequence storing means to be sent to said digit receiving means if no such matched output signal is generated after a predetermined number of digits have been detected by said digit detecting means or a predetermined time interval has elapsed from the time said enabling means detected the start of said telephone number.

6. An apparatus adapted for use in a telephone system including digit receiving means for receiving signals indicative of the digits of a telephone number dialed by a subscriber on a telephone circuit and telephone system routing switch means for connecting and disconnecting said digit receiving means from said telephone circuit, an apparatus for converting a telephone number having the two digits "00" to a telephone number comprising the digit "0" followed by a predetermined sequence of one or more digits, said apparatus comprising:

means for connecting said apparatus into said telephone system at a location between said central office routing switch means and said digit receiving means such that said apparatus intercepts said signals indicative of said dialed telephone numbers prior to said signals entering said digit receiving means when said central office routing switch means has connected said telephone circuit to said digit receiving means;

enabling means for detecting the start of a telephone number on said telephone circuit;

digit detecting means for detecting and decoding said signals indicative of the digits of a said telephone number dialed on said telephone circuit at a location in said telephone system prior to said digits entering said digit receiving means;

first comparing means connected to said digit detecting means for detecting a telephone number beginning with the digit "0";

disconnecting switch means for disconnecting said digit receiving means from said telephone circuit, said disconnecting switch means having a first state in which said digit receiving means is connected to said telephone circuit and receives the said signals indicative of each digit dialed on said telephone circuit and a second state in which said digit receiving means is disconnected from said telephone circuit and does not receive said signals, said disconnecting switch means being set to said first state by said enabling means when said enabling means detects the start of a telephone number dialed on said telephone circuit, and said disconnecting switch means being set to said second state when a telephone number beginning with "0" is detected by said first comparing means; and second comparing means connected to said digit detecting means and to said digit receiving means, operative only when said disconnecting switch means is in said second state for detecting the second and successive digits of a telephone number dialed on said telephone circuit, said second comparing means outputting said second digit and successive digits to said digit receiving means if said second digit is not a "0", and said second comparing means outputting a predetermined sequence of digits to said digit receiving means if said second digit is a "0".

* * * * *